United States Patent [19]

Aleksoff et al.

[11] Patent Number: 4,847,796

[45] Date of Patent: Jul. 11, 1989

[54] METHOD OF FRINGE-FREEZING OF IMAGES IN HYBRID-OPTICAL INTERFEROMETRIC PROCESSORS

[75] Inventors: Carl C. Aleksoff; Nikola S. Subotic, both of Ann Arbor, Mich.; Nickolas P. Viannes, Brunswick, N.Y.

[73] Assignee: Environmental Research Inst. of Michigan, Ann Arbor, Mich.

[21] Appl. No.: 91,480

[22] Filed: Aug. 31, 1987

[51] Int. Cl.[4] .......................... G06J 1/00; G06G 9/00; G02F 1/11

[52] U.S. Cl. ................................ 364/602; 350/162.12; 350/358; 364/822

[58] Field of Search ............... 364/602, 604, 606, 822, 364/841, 845, 807, 800; 350/96.11, 96.12, 96.13, 96.14, 162.11, 162.12, 162.13, 162.14, 353, 358; 356/345

[56] References Cited

U.S. PATENT DOCUMENTS

| | | | |
|---|---|---|---|
| 4,468,093 | 8/1984 | Brown | 364/822 X |
| 4,531,196 | 7/1985 | Lin | 364/822 X |
| 4,567,569 | 1/1986 | Caulfield et al. | 364/845 |
| 4,670,854 | 1/1987 | Mossberg et al. | 364/822 |
| 4,686,647 | 8/1987 | Soffer et al. | 364/850 |

*Primary Examiner*—Joseph Ruggiero
*Attorney, Agent, or Firm*—Krass & Young

[57] ABSTRACT

The invention is a method for obtaining fringe visibility in hybrid-optical interferometric processors. Encoded data defining an image is utilized to provide both a timing input signal and a method of modulating a light source in synchronization with the modulation of an optical-acoustical element. The modulated light is then detected in a receptor array and converted into signals suitable for driving a readable, visual-imaging device.

6 Claims, 5 Drawing Sheets

METHOD OF FRINGE-FREEZING OF IMAGES IN HYBRID-OPTICAL INTERFEROMETRIC PROCESSORS

FIELD OF THE INVENTION

The invention pertains generally to methods and apparatus for improving fringe visibility in optical-electronic-digital signal processing systems, and more particularly to methods of modulating coherent light utilizing laser diodes, acousto-optic cells, and time integrating solid-state energy detectors to accomplish improved signal processing capabilities utilizijng fringe freezing techniques.

BACKGROUND OF THE INVENTION

In interpretation of signals received from a wide variety of receptors, (e.g., television cameras, x-ray scanning devices, radar), it is desirable to process the signals in such a manner as to produce a processed and filtered image capable of representation in a more specifically usable form, for example, as a visible display on a conventional video display terminal. It is also desirable to precisely control the properties of the individual aspects of the displayed image. These systems,referred to as hybrid-optical systems have the potential to gain an important role in signal processing due to their compactness, versatility and adaptability. Recently, high power, single-mode laser diode systems have become available enabling the useful operation of a certain class of hybrid-optical interferometric processors. In this type of processor, the diffracted and undiffracted orders of an acousto-optic cell are interfered. Due to the relative doppler frequency shift between the orders, the interference fringes are modulated at the doppler frequency. This typically would cause the destruction of fringe visibility when observed with time integrating detectors such as television cameras. To retain frame visibility, accordingly, optical source modulation is introduced which freezes the fringes to produce a high visibility output. Restoration of the fringe contrast can be achieved by shifting one of the two fields in frequency.

A second acousto-optical cell may be utilized and modulated at the same frequency as the original. However, this solution is not particularly desirable, due to the additional signal processing circuitry, acousto-optic cell, and associated optics which make this methodology unduly complex.

A continous wave gas laser may be utilized with external modulation sources. However, because of their bulk, high cost, and necessity for external modulation continuous wave gas lasers are not well suited to compact installations. In addition, CW gas lasers exhibit limitations in the number of wave lengths of emitted light which are available. Solid state laser diodes, on the other hand, offer a wide range of alternative wave lengths.

The present invention overcomes these shortcomings and provides a lower cost, efficient, compact and simplified method of improving fringe resolution.

DESCRIPTION OF THE PREFERRED EMBODIMENT

Figure 1:
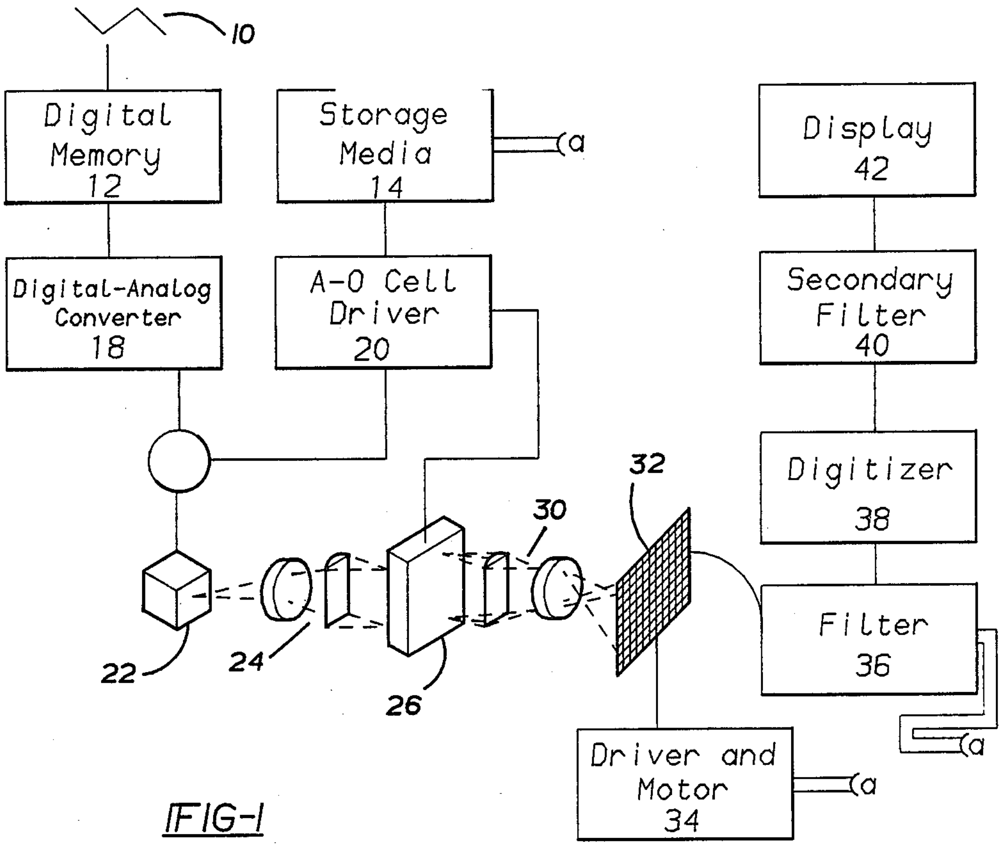
FIG. 1 is a composite perspective view and block diagram of the individual components of the invention depicting the signal and light paths.

Referring now to FIG. 1, image signal data 10 is stored in a digital memory 12 where it is read out at a specified rate. The data may be digitized and stored in a variety of computer 14 compatible media, such as computer tapes or disks. Digital data is preferably converted to analog format, however, the data can likewise be obtained in analog form and fed directly to the remaining components in the system.

After the digital-analog converter 18, the signal is a real (non-negative) analog signal that is used to intensity modulate the laser diode 22. A multiplying signal is derived from the A-O (Acoustic-Opticl) cell driver 20 as part of the fringe-freezing technique and will be described herein. After passing through primary optics 24 the modulated light illuminates the A-O cell 26 driven by a linear FM sweep signal that is in synchronism with each input line of data. The A-O cell produces a diffracted beam that scans linearly with the FM sweep. The undiffracted beam is also allowed to pass and is of equal intensity to the diffracted beam. Secondary optics 30 imagein the y-direction (acoustic wave propagation direction) the plane of the A-O scanner to the detector array while in the x-direction the light is spread (i.e. produces a backprojection of the light). The detector array 32 rotates through an arc to establish the proper polar angle for each item of data. The two beams from the A-O cell will interfere at the detector array to produce the 2D cosine transform (with respect to the detector coordinates) of the instantaneous (spatial) signal inserted via the laser diode.

This process might be better understood by considering the signal in the pseudo phase history plane. The two beams from the A-O scanner are focused in this plane. The spot due to the diffracted beam moves linearly in the y-direction while the spot due to the undiffracted beam remains stationary at the center of the optical system. If we view these points from the perspective of the rotating detector array then the moving spot traces out the polar formatted phase history geometry while the stationary spot is at the center of the polar lines. Both spots are intensity modulated according to the phase history signal and hence a pseudo-phase history is plotted out in that plane. The detector array lies in the FT (cosine) transform plane of the pseudo phase history plane. That is, the light from the two spots diverge out and interfere to form a fringe pattern at the detector array that is the 2D cosine transform of the instantaneous phase history sample. The integration of all the fringe patterns as seen by the rotating detector array produces the desired image.

Ideally, the detector array could (incoherently) integrate all the transforms of the phase history samples until the final image is generated. However, due to practical dynamic range limitations of the detectors the integration is also partially done in a digital processor memory. That is, the detector array is part of a standard commercial video camera that reads out all the detectors in a standard frame time. It takes a number of frames to process all the data. Each frame of data from the camera, after appropriate filtering is digitized and summed, pixel-by-pixel, into the digital processor memory. Thus, the combination of the detector array and digital memory acts as a large dynamic range detector array.

Returning to the discussion of the optical process it is noted that its operation depends on the interference of the zero-order (i.e., non-diffracted order) beam with the first-order diffracted beam. The inteference fringes produced by using CW light are moving ones since the frequency of the first-order beam is (doppler) shifted by the acoustic wave. Integration of these fast moving fringes by the slow framing detectors would completely wash out the fringes. Hence the technique of fringe freezing is used. This technique can be considered to be similar to strobing a rotating object in order to make the object appear stationary. As indicated in FIG. 1 the fringe freeze signal is generated by intensity modulating (pulsing) the laser source at the same frequency as that of the A-O scanner by mixing the A-O scanner frequency with that of the main pulse history signal.

Figure 3:
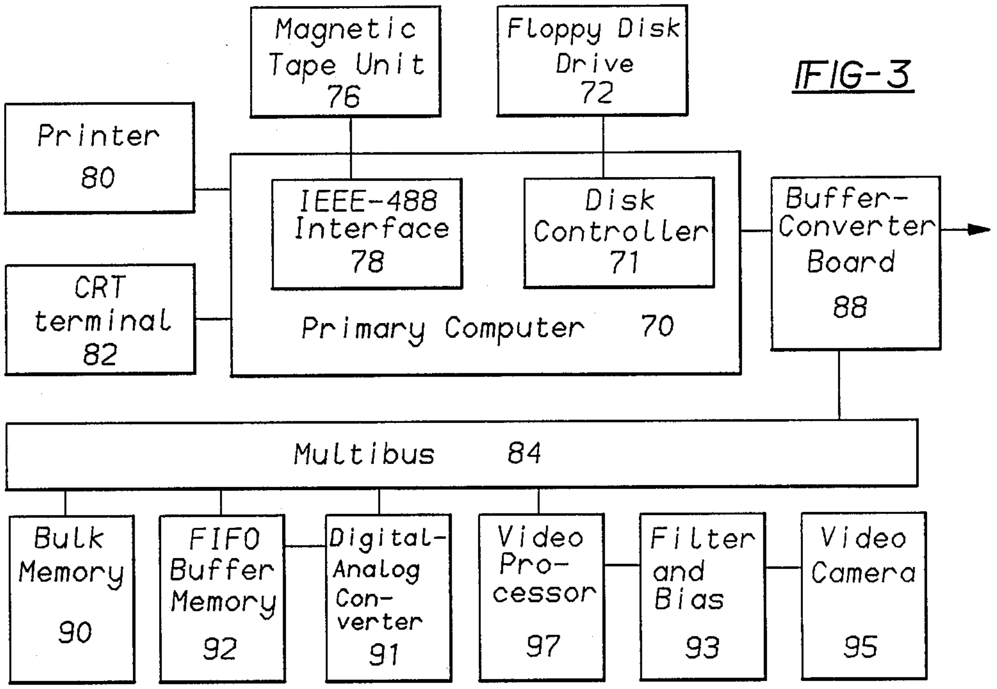
FIG. 3 is a block diagram of the computer system.

The computer complex used in the experiment is schematically illustrated in FIG. 3. The complex is built around a multibus interface system using various circuit cards configured to provide the desired functions. The primary computer 70 is single card Motorola 68000 chip computer with the usual I/O devices: Floppy disks 72, disk controller 71, CRT terminal 82, printer 80 and a magnetic tape 76 input via a IEEE-488 interface 78. The bulk memory 90 is a set of multibus boards with 3M bytes of storage. The data could be loaded from computer compatible tapes to this memory. Alternatively, the computer could internally generate test signals that were loaded into this memory. The signals consisted of 8 bit samples.

The input data is preferably read out of memory in a DMA (direct memory access) mode to a buffer-converter board 88 which provides analog signals at the proper rate to feed the laser diode. Data stored in the bulk memory passes over the multibus 84 at non-uniform rates due to bulk memory refresh requirements. Two FIFO (first in, first out) buffer memories 92 on the board accepted the data in a ping-pong mode at non-uniform rates and read it out to a D/A converter 91 at appropriate uniform rates. The rate at which data are read out and the number of samples are programmed from the computer. The sample clock rate can be controlled externally or run from the computer clock. A trigger signal to start the rotation of the detector array as well as a signal to start the sweep for the A-O scanner are also supplied by the computer. The time delay between the start of the data output and the strobe is also programmable.

The other part of the computer complex operates with the received signal from the optical processor. The video 95 signal from the detector array is filter, a bias 93 inserted and is then sent to the video processor 97 which consists of a set of commercial available multibus cards under control of the computer. The image processor's operations generally include digitization and storage of television frames, processing of data at video rates, and the display of stored data.

Figure 4:
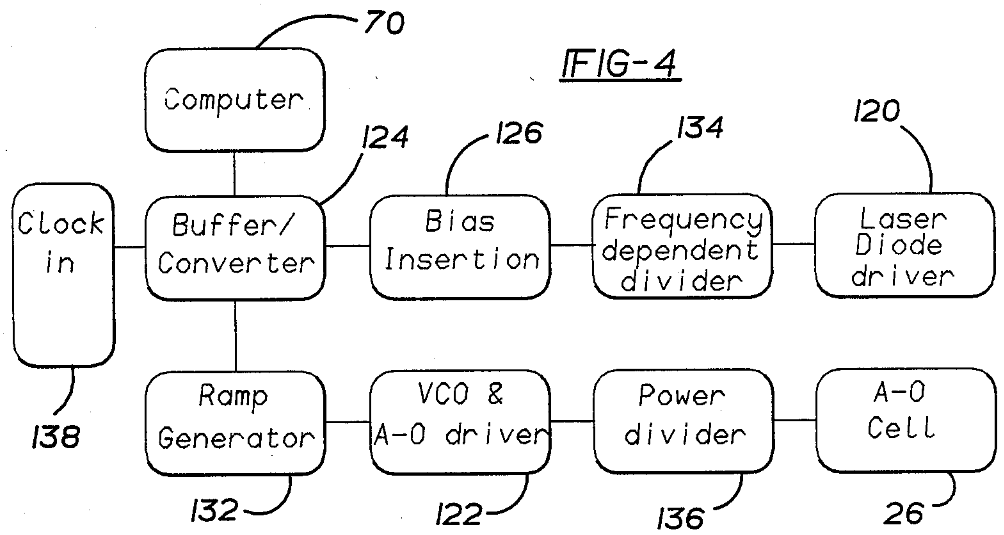
FIG. 4 is a block diagram of the diode and A-O cell scan driver circuits.
Figure 5A:
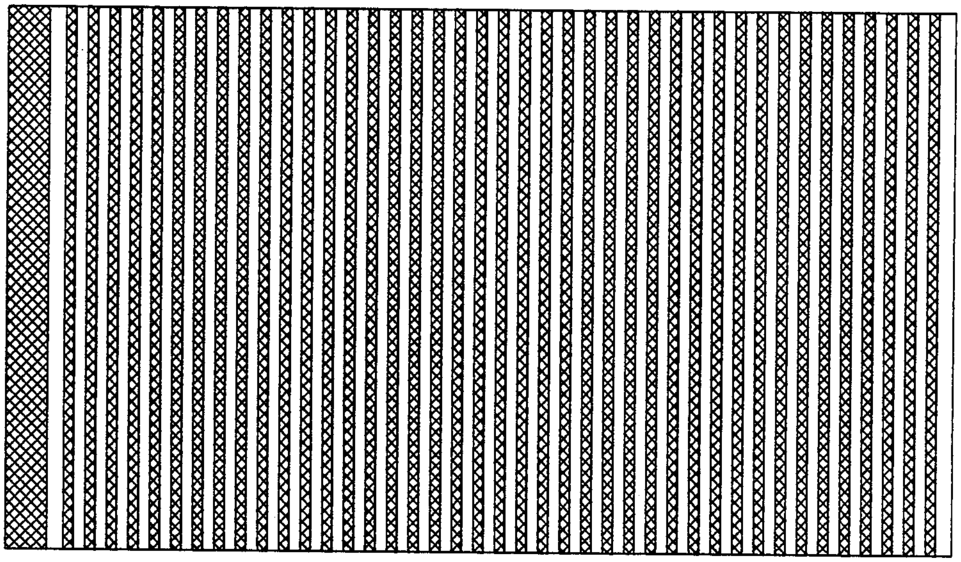
FIGS. 5A–5D constitute two graphic representations of the laser diode output intensity.
Figure 5B:
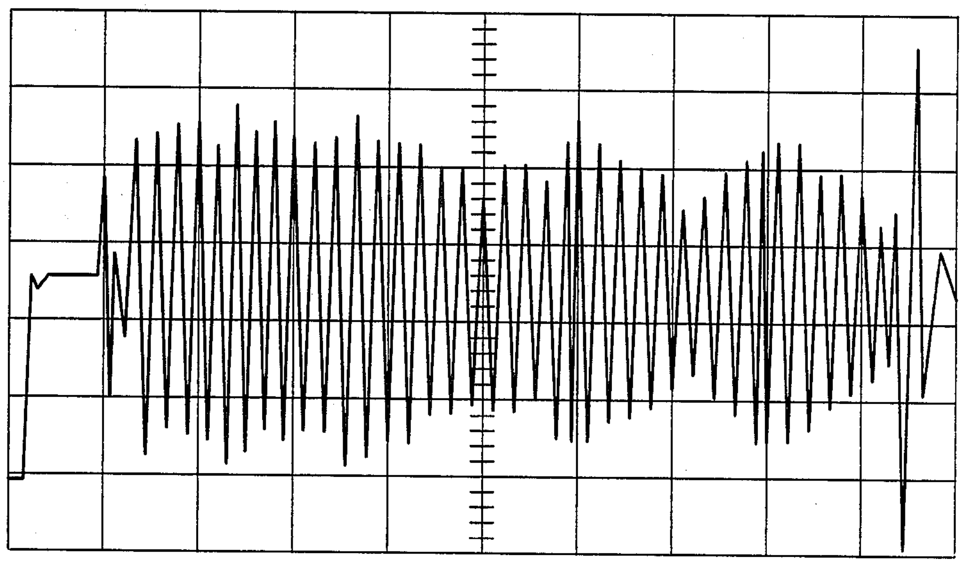
Figure 5C:
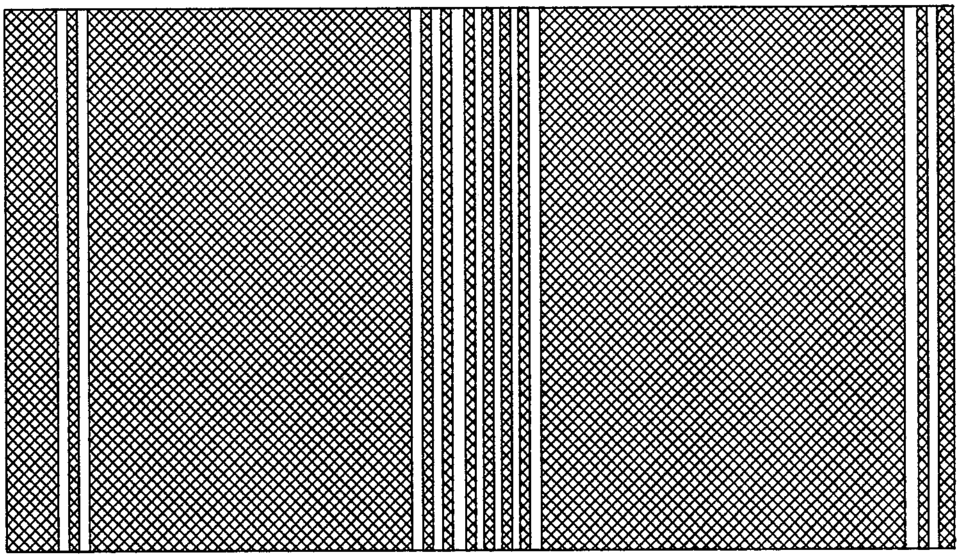
Figure 5D:
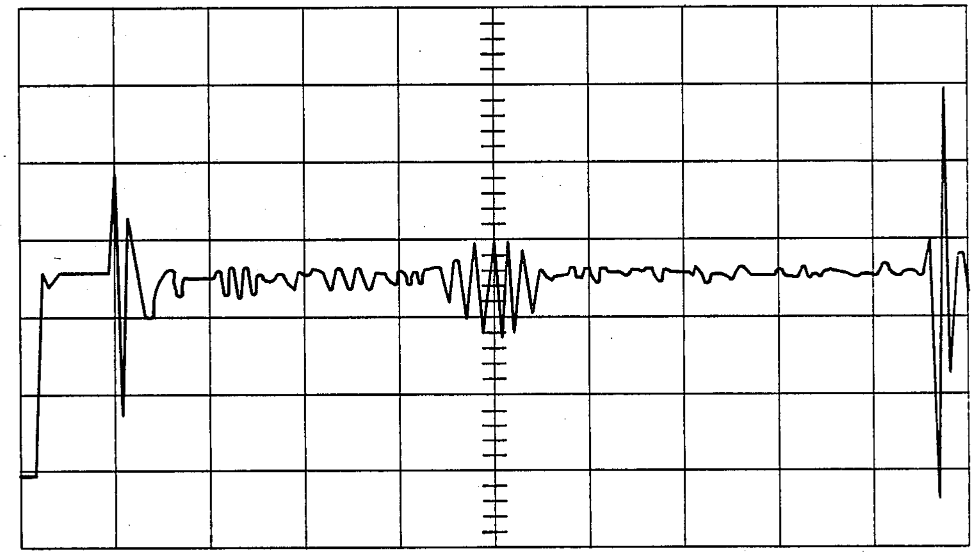

FIG. 4 shows the "front-end" electronics in more detail. The analog output from the buffer/converter board is first put on a bias appropriate for the laser diode driver 120. This biased phase history signal is combined with a portion of the FM sweep that drives the A-O cell to produce the composite signal that actually feeds the laser diode driver. The FM sweep signal is obtained by driving a VCO 122 with a ramp generator 132 that is triggered with the strobe signal from the buffer/converter board 124. The phase history signal is a relatively low frequency signal of less than 50 kHz while the FM sweep can range from 30 to 60 MHz.

For example, FIG. 5 shows the laser diode output intensity when driven with a composite signal composed of a square wave PH test signal of 200 Hz pulse rate frequency and a fixed frequency signal of 30 MHz. FIG. 5*b* is an expanded blow-up of the highlighted portion of the trace in FIG. 5*a*. Notice that the 30 MHz signal is not sinusoidal in the laser output but is more pulse-like in order to enhance the fringe visibility. The more narow the pulse the better fringe visibility that is obtained at the detector. The pulse-like character was obtained by appropriately biasing the drive signals on the laser diode transfer curve. In effect, the PH signal amplitude modulates the pulse-like carrier.

Figure 2:
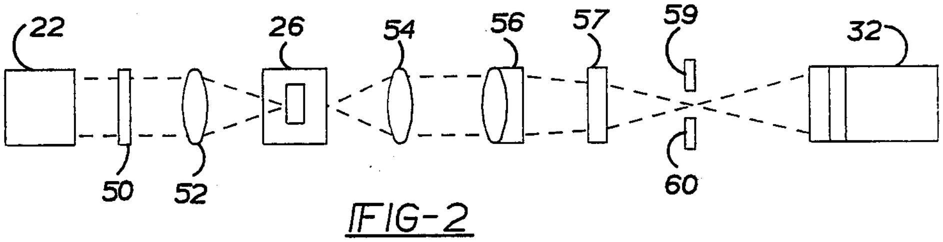
FIG. 2 is a side view of the optical arrangement of the invention.

FIG. 2 shows the actual optical arrangement used in one embodiment of the invention. The source is a commercially available laser diode 22 system emitting up to 30 mw of single mode CW light at 820 nm. The light is collimated by the internal optics of the laser diode system.

Consider the side view first, FIG. 2. Lens 52 converges the light to a line along the A-O cell. The diffracted beam and the undiffracted beam are then collimated by lens 54. Lens 56 spreads the light across the detector array to carry out the backprojection operation.

Figure 2A:
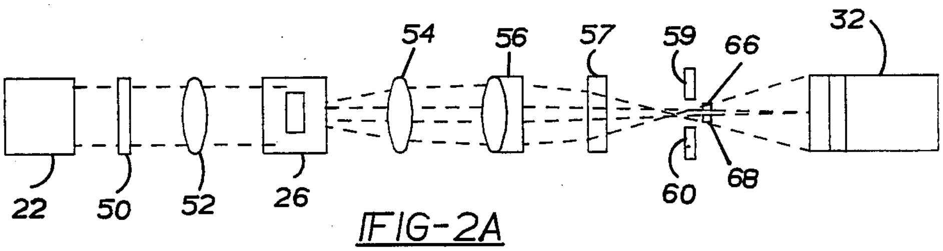
FIG. 2*a* is a top view of the same arrangement showing the relative positions of the diffracted and undiffracted spots.

Consider the top view next, FIG. 2*a*. Lenses 52 and 54 have no significant effect on this dimension. The collimated light entering the A-O cell is split into a diffracted beam 66 and the undiffracted beam 68. Lens 56 images the plane of the A-O cell onto the detector array with a magnification of about 6.3.

The light is focused into two spots at plane 57, which is labeled the pseudo phase history plane and at which a spatial filter 60 is placed to remove any higher order diffraction from the A-O cell. The light from the laser diode is linearly polarized. The quarter wave plate 50 rotator produces circularly polarized light which is required for optimum diffraction efficiency from the A-O cell. The A-O scanner uses an acoustor shear wave in the birefrigerant crystal ($TiO_2$) for its operation. However, the light is elliptically polarized in the opposite sense for the two beams exiting the A-O scanner. In order to guarantee optimum fringe visibility at detector array a linear polarizer 58 is oriented to give equal energy in both beams at the detector array, as well as to produce a common linear polarization.

With reference again to FIG. 1, the detector array 32 is mounted on a rotary head driven by a microstep motor and computer controllable driver 34. However, the driver may be set up manually and only use the trigger from the computer to start its rotation. The rotation is continuous during the processing.

Let us now consider the output electronics. The detector 34 is a CCD image sensor (488 vertical detectors by 380 horizontal detectors) built into a camera and included a fiber optic input faceplate. The output of the camera is preferably in a standard RS170 television format, 30 frame per second and interlaced lines.

The signal from the camera includes a large bias with respect to the signal that is to be retrieved. Hence the signal is sent through a filter 36 to remove the bias. The filter is actually composed of two filters. The first filter is a low pass filter with a cut off frequency of 4.2 MHz which removes various clocking noises. The second filter is a one stage transversal filter (i.e. a differencing circuit with a time delay of 142 nsec) which removes the bias and discriminates against lower frequencies. An optimum bias is inserted on the filtered signal, so that it can be properly digitized as a positive signal.

The digitizer 38 operates at a 10 MHz sample rate with 8 bits of resolution and produced a $512\times512$ pixel frame. Each frame of data is similarly digitized and the new pixel values are added to the previous pixels values. Also, a constant signal that is the same as the average signal for the input line of data is run through the whole process and the resulting frames are subtracted from the memory. This latter subtraction removes the inserted bias, fixed detector patterns noise, and other fixed optical spatial noises.

The image in the memory is on a spatial carrier which is removed by a secondary filter 40 before displaying the image. Hence, the image signal on its way to the display 42 is first rectified by a look-up table and then converted into an analog signal with the image processor before it is low pass filtered externally with a 1 MHz cut off the produce the magnitude image.

A better understanding of the fringe visibility function and its derivation can be seen from the following formulae. With general reference to FIG. 1, showing a generalized signal flow diagram of the type of interferometric processor architecture, a point source described by the quasi monochromatic analytic time function $$S(t)=U(t)e^{+2\pi i v_t}$$
$$=M(t)e^{+2\pi i v v_o t}+\alpha(t)$$

is split into two waves, each of which is frequency translated (e.g. via an acousto-optic cell), and then recombined as plane waves to give the instantaneous intensity where S equals the strength of the source, t represents the time, U represents analytic amplitude, $o$ represents the optical carrier of the source, (t) is the phase of the source and (Mt) is the magnitude of the source. The instantaneous intensity, therefore, is represented $$I(t,\bar{r})=|A_1 S(t-t_1)\exp\{i[2\pi\nu_1(t-\tau_1)+\phi_1-\bar{k}_1\cdot\bar{r}$$
$$+A_2 S(t-t_2)\exp\{i[2\pi\nu_2(t-\tau_2)+\phi_2{}'\bar{k}_2\cdot\bar{r}_1]|^2$$

$\nu_o$ is the optical carrier of the source $M(t)=|S(t)|=,|U(t)|$ is the magnitude of the source $\alpha(t)$ is the phase of the source $A_j$ is the fraction of magnitude of the source in the $j$th beam Note: $A^2{}_1+{}_{A2}{}^2=,|$ is assumed.

$\nu_j$ is the frequency offset from $\nu_o$ in the $j$th beam $\phi_j$ is the insertion phase for the $j$th beam $$\text{Note: } k_j=|\bar{k}_j|=\frac{2\pi}{\lambda_j}=\frac{2\pi(\nu_o+\nu_i)}{C}$$

$\lambda_i$ is the wavevector for the $j$th beam $\lambda_i$ is the wavelength for the $j$th beam $\bar{r}$ is the position vector in the output source $\tau_j$ is the time delay from the $j$th frequency modulation to the output origin $t_j$ is the time delay from the source to the output origin along the $j$th path The instantaneous intensity can be written as $$I(t,\bar{r})=I_{11}(t)+I_{22}(t)+I_{12}(t)+I_{21}(t)$$

where $$I_{11}(t)A_1{}^2|{}^U(t-t_1)|2,=A_1{}^2M_2(t-t_1)$$

$$I_{22}(t)=A_2{}^2|{}^U(t-t_2)=A_2{}^2=M^2(t-t_2)$$

$$I_{12}(t)=A_1A_2U^*(t-t_1)U(t-t_2)\exp(2\pi i\Delta\nu t+i\beta$$

$$I_{21}(t)=A_1A_1U(t-t_1)U^*(t-t_2)\exp(-2\pi i\Delta\nu t-i\beta)$$

where $\Delta\nu={}_2-{}_{\nu 1}$ $$\beta=\phi_{2-\phi 1}-(\bar{k}_2-k_1)\cdot\bar{r}-2\pi(\nu_{2\pi 2}-{}^{\nu 1\pi 1})-2\pi\nu(t_2-t_1)$$

The "instantaneous" intensity spectrum is defined as the Fourier transform of the instantaneous intensity and is given by $$i(f,\bar{r})=A_1{}^2\chi^{11}(f)+A_2{}^2\chi^{22}(F)$$
$$+A_1A_2\chi_{12}(f+\Delta\nu)e^{i\beta}+A_1A_2\chi_{21}(f-\Delta\nu)e^{-i\beta},$$

wherein $i(f,\bar{r})=\int I(t,\bar{r})e^{-2\pi ift}{}_{dt}$ $$=F_t\{(I)(t,\bar{r})\}$$

and $$\chi mn(\bar{f})=F_t\{U^*(t-t_m)U(t-t_n)\}=[u^*(f)e^{+2\pi it_m f}]\text{-}{}^*[u(f)e-2\pi it_n f]$$

Here ★ represents the cross correlation $$a^*(f)★b(f)=\int a^*(f')b(f'+f)dt'$$

Now we note that $\chi_{21}(f)=\chi^*{}_{12}(-f)$,

An ideal point detector with infinite integration will see the signal $$I(\bar{r})=\int_{\infty}^{\infty}I(t,\bar{r})dt$$
$$=I(\bar{r})=i(O,r)$$
$$=(A_1{}^2+A_2{}^2)\chi_{11}(0)+$$
$$2A_1A_2|\chi_{12}(\Delta\nu)|\cos[\beta+\xi(\Delta\nu)]$$

where E(f) is the phase of $\chi_{12}(f)$, ie.

$\chi_{12}(f)=e^{i}\xi(f)$

Here the visibility can be described by $$V=\frac{\text{Max } I(\bar{r})-\text{Min } I(\bar{r})}{\text{Max } I(\bar{r})+\text{Min } I(\bar{r})}$$
$$=V_oV_m$$

where $$V_o=\frac{2A_1A_2}{A_1{}^2+A_2{}^2}$$

and $$V_m=\frac{|X_{12}(\Delta\nu)|}{X_{11}(0)}$$

The effect of the source on the fringe visibility is described by $V_m$. We note that $0\leqq V_m\leqq 1$.

The special case where $t_1 = t_2$ gives that $$\chi_{12}(f) = \chi_{11})$$

which is the Fourier transform of the source intensity only, i.e. the phase variations of the source can be ignored.

We also note that if we let $t_1 = t_2 = 96\ /2$ then $$V_m = |\chi(\Delta\nu, \tau)|$$

p where $\chi(\Delta\nu, \tau)$ is the normalized ambiquity function.

It can be seen, therefore, that by appropriate modulation of the source waveform, fringe freezing is obtained in interferometric systems where a temporal frequency mismatch occurs between the two waves. It is accordingly possible to devise optical system architectures to remove the undesirable interference between multiple diffracted orders which are produced by acousto-optic cells, by the use of a relatively simple architecture. The invention herein described utilizes optics which are simple and operate primarily in the imaging mode and which are readily available, in contrast the fourier transforming lenses which are not readily available and are very expensive. Likewise, the present optical design has the potential to be made very compact. Since the front end of the system is a single dimension processor, it is possible to place many of the components on a planar integrated optics chip. The processor is also a spatial single side-band type of system, wherein almost all of the light forms the desired image and there is no conjugate image to drain significant portions of the energy away. Both the diffracted and non-diffracted beams of the acousto-optic cell are used, and it is the acousto-optic cell itself that acts as a beam splitter for the interferometric operation of the system. Further, the interferometer is achromatic, and hence does not require a coherent source. The laser diode is desirable, however, because it is a high power source which can be directly modulated and is both small and efficient, thereby avoiding the requirement for an extra device to perform the modulation task. Finally, since the interferometer is also a near in-line type of interferometric architecture, it tends to be vibration-insensitive due to the fact that it can be easily constructed as a rigid mechanical system.

Figure 6:
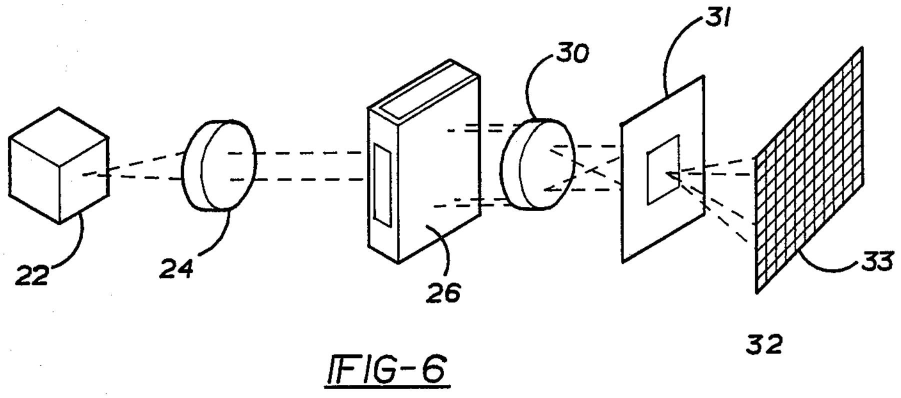
FIG. 6 is a stylized perspective view of an alternative embodiment.

Many triple product optical processor architectures can benefit from using the fringe freezing technique. FIG. 6 shows a unique simplified embodiment of a triple processor architecture made possible by the fringe freezing technique. This processor uses two orthogonally oriented acousto-optic cells 26 mounted on the same substrate. One source produces x-axis light beam motion and the other y-axis motion. A diffracted order from one cell is interfered with a diffracted order of the other cell to produce the desired fringes. An imaging lens 30 is used to image the acoustic-optic cell plane to the detector 32. An aperture 31 in the Fourier transform plane of the lens is used to block all but the desired two diffracted beams. The source modulation is now synchronized to the difference frequency between the two diffracted orders in order to freeze the fringes. Otherwise, the input signals to the source and the output processing of the detector signals are similar as in the first embodiment.

The advantage of this type of architecture is that it allows arbitrary orientation of the fringes (within the limits of the acousto-optic scanner ranges and offsets) without using mechanical devices to produce motion of the detector array as was required in the first embodiment illustrated in FIG. 1.

Having thus described our invention, numerous obvious modifications may be made as those skilled in the art without deviating from the invention herein claimed which is:

We claim:

1. An improved method for obtaining fringe visibility in hybrid-optical interferometric processors comprising:

(A) transferring digitally-encoded data defining an image to a digital memory device;

(B) storing said data for a specified time;

(C) converting said data to analog format;

(D) modulating an acousto-optic cell utilizing a frequency modulated linear sweep derived from said data;

(E) modulating a coherent light source in synchronization with said linear frequency modulated sweep utilizing said data;

(F) directing the modulated output of said coherent light source through a first series of lenses;

(G) directing the light output from said first series of lenses through said modulated acousto-optic cell;

(H) directing the output of said acousto-optic cell through a second series of lenses;

(I) detecting the output of said second series of lenses; and (J) converting said detected output into signals suitable for driving a readable, visual image and device.

2. The invention as described in claim 1, wherein said conversion of said detected output further comprises:

(A) filtering said detected output;

(B) converting said filtered output into digital form; and (C) digitally summing said output on a pixel-by-pixel basis.

3. An improved method for obtaining fringe visibility in hybrid-optical interferometric processors comprising:

(A) transferring digitally-encoded data defining an image to a digital memory device;

(B) storing said data for a specified time;

(C) converting said data to analog format;

(D) modulating an acousto-optic cell utilizing a frequency modulated linear sweep derived from said data;

(E) modulating a coherent light source in synchronization with said linear frequency modulated sweep utilizing said data;

(F) directing the modulated output of said coherent light source through a first series of lenses;

(G) directing the light output from said first series of lenses through said modulated acousto-optic cell;

(H) directing the output of said acousto-optic cell through a second series of lenses;

(I) detecting the output of said second series of lenses on an array of receptors;

(J) converting said detected output into signals suitable for driving a readable, visual imageing device; and (K) utilizing said data to initiate synchronized rotation of said array.

4. The invention of claim 2, which further comprises a second filtering of said detected output wherein said second filtering removes any carrier signal embedded in said data.

5. An improved method for signal processing in hybrid-optical processors comprising:

(A) means for inputting data into said processor;

(B) utilizing said input data to initiate a timing event;

(C) modulating a light source utilizing said input data and a second data signal synchronized to said timing event;

(D) modulating an optical element utilizing said second data;

(E) directing said modulated light source output to said modulated optical element; and (F) detecting the output of said modulated optical element.

6. The method of claim 5, which further comprises the additional step of converting said detected output into signals suitable for driving a readable, visual imaging device.

* * * * *

UNITED STATES PATENT AND TRADEMARK OFFICE
CERTIFICATE OF CORRECTION

PATENT NO. : 4,847,796

DATED : July 11, 1989

INVENTOR(S) : Aleksoff, et al

It is certified that error appears in the above-identified patent and that said Letters Patent is hereby corrected as shown below:

Column 1, line 12, "energy" should be --array--.

Column 5, line 35, " $S(t) = U(t)e^{+2\pi i\nu_t} = M(t)e^{+2\pi i\nu\nu_o t + \alpha(t)}$ " should be -- $S(t) = U(t)e^{+2\pi i\nu_o t} = M(t)e^{+2\pi i\nu_o t + \alpha(t)}$ --.

Column 5, line 48, " $I(t,\bar{r}) = |A_1 S(t-t_1)\exp\{i\{2\pi\nu_1(t-\tau_1) + \phi_1 - \bar{k}_1\cdot\bar{r} + A_2 S(t-t_2)\exp\{i[2\pi\nu_2(t-\tau_2) + \phi_2 \bar{k}_2\cdot\bar{r}]\}|^2$ "

should be -- $I(t,\bar{r}) = \left|A_1 S(t-t_1)\exp(i[2\pi\nu_1(t-\tau_1)+\phi_1-\bar{k}_1\cdot\bar{r}] + A_2 S(t-t_2)\exp(i[2\pi\nu_2(t-\tau_2)+\phi_2-\bar{k}_2\cdot\bar{r}]\right|^2$ --.

UNITED STATES PATENT AND TRADEMARK OFFICE
CERTIFICATE OF CORRECTION

PATENT NO. : 4,847,796

DATED : July 11, 1989

INVENTOR(S) : Aleksoff, et al

It is certified that error appears in the above-identified patent and that said Letters Patent is hereby corrected as shown below:

Column 5, line 55, "νo is" should be --where νo is--.

Column 5, line 56, "|=,|" should be --|=|--.

Column 5, line 61, "Note: $A^2{}_1 + A_2{}^2 =,|$ is assumed " should be -- Note: $\Lambda_1^2 + \Lambda_2^2 - 1$ is assumed--.

Column 5, line 63, delete " $\lambda_i$ is the wavevector for the $j$th beam ".

Column 6, line 12, " $I_{11}(t)A_1{}^2|{}^{\prime}(t-t_1)|2,=A_1{}^2M_2(t-t_1)$ " should be -- $I_{11}(t) - \Lambda_1^2 \left|U(t-t_1)\right|^2 - \Lambda_1^2 M^2(t-t_1)$ --.

Column 6, line 14, " $I_{22}(t)=A_2{}^2|U(t-t_2) = A_2{}^2 = M^2(t-t_2)$ " should be -- $I_{22}(t) - \Lambda_2^2 \left|U(t-t_2)\right|^2 - \Lambda_2^2 M^2(t-t_2)$ --.

Column 6, line 15, "+iß " should be -- +iβ)--.

UNITED STATES PATENT AND TRADEMARK OFFICE

CERTIFICATE OF CORRECTION

PATENT NO. : 4,847,796

DATED : July 11, 1989

INVENTOR(S) : Aleksoff et al

It is certified that error appears in the above-identified patent and that said Letters Patent is hereby corrected as shown below:

Column 6, line 17, " $\Delta\nu=2-\nu 1$ " should be -- $\Delta\nu=\nu_2-\nu_1$ --.

Column 6, line 19, " $\beta=\phi_2-\phi_1-(\bar{k}_2-\bar{k}_1)\cdot\bar{r}-2\pi(\nu_{2\pi 2}-\nu_{1\pi 1})-2\pi\nu(t_2-t_1)$ " should be -- $\beta - \phi_2 - \phi_1 - (\bar{k}_2 - \bar{k}_1) \cdot \bar{r} - 2\pi(\nu_2 r_2 - \nu_1 r_1) - 2\pi\nu_o(t_2 - t_1)$ --.

Column 6, line 25, " $i(f.\bar{r})=A_1{}^2 x^{11}(f)+A_2{}^2 x^{22}(F)$ " should be -- $i(f,\bar{r}) - A_1^2\, x_{11}(f) + A_2^2\, x_{22}(f)$ --.

Column 6, lines 30 and 31, " $xmn(\bar{f})=F_t\{U^*(t-t_m)U(t-t_n)\}=[u^*(f)e^{+2\pi i t_m f}]\cdot{}^*[u(f)e^{-2\pi i t_n f}]$ " should be $$-- \begin{array}{l} x_{mn}(\bar{f}) - F_t(U^*(t-t_m)U(t-t_n)) \\ - \left[u^*(f)e^{+2\pi i t_m f}\right]\bigstar\left[u(f)e^{-2\pi i t_n f}\right] \end{array} --.$$

Column 6, line 36, " $\chi_{21}(f)=\chi^*{}_{12}(-f)$ " should be -- $x_{21}(f) - x^*_{12}(-f)$ --

Column 6, line 47, "E(f)" should be -- $\xi(f)$ --.

Column 6, line 48, " $\chi_{12}(f)=e^{i\xi}(f)$ " should be -- $\chi_{12}(f) = |\chi_{12}(f)|e^{i\xi(f)}$ --.

UNITED STATES PATENT AND TRADEMARK OFFICE
CERTIFICATE OF CORRECTION

PATENT NO. : 4,847,796

DATED : July 11, 1989

INVENTOR(S) : Aleksoff et al

It is certified that error appears in the above-identified patent and that said Letters Patent is hereby corrected as shown below:

Column 6, line 52, "V" should be -- $\nu$ --.

Column 6, line 54, "$V_oV_m$" should be -- $\nu_o\nu_m$ --.

Column 6, line 58, "$V_o$" should be -- $\nu_o$ --.

Column 6, line 64, "$V_m$" should be -- $\nu_m$ --.

Column 6, line 68, "$V_m$" should be -- $\nu_m$ --.

Column 7, line 2, "$\chi$12(f)=$\chi$11)" should be -- $\chi_{12}(f) = \chi_{11}(f)$ --.

Column 7, line 7, "$t_1$=$t_2$=96 /2" should be -- $t_1=-t_2=\tau/2$ --.

Column 7, line 9, "$V_m$" should be -- $\nu_m$ --.

Column 7, line 10, "p where" should be --where--.

Signed and Sealed this

Twenty-third Day of April, 1991

*Attest:*

HARRY F. MANBECK, JR.

*Attesting Officer* — *Commissioner of Patents and Trademarks*

UNITED STATES PATENT AND TRADEMARK OFFICE

CERTIFICATE OF CORRECTION

PATENT NO. : 4,847,796

DATED : July 11, 1989

INVENTOR(S) : Aleksoff, et al

It is certified that error appears in the above-identified patent and that said Letters Patent is hereby corrected as shown below:

On the title page, inventor's name "Nickolas P. Viannes" should be --Nickolas P. Vlannes--.

Signed and Sealed this

First Day of December, 1992

*Attest:*

DOUGLAS B. COMER

*Attesting Officer*

*Acting Commissioner of Patents and Trademarks*